United States Patent [19]
Palmer et al.

[11] Patent Number: 6,107,435
[45] Date of Patent: Aug. 22, 2000

[54] SILICA FILLED RTV COMPOSITIONS HAVING ADHESION TO GLASS AND CERAMIC MATERIALS

[75] Inventors: Richard Alan Palmer; Nick Evan Shephard, both of Midland, Mich.

[73] Assignee: Dow Corning Corporation, Midland, Mich.

[21] Appl. No.: 09/105,582

[22] Filed: Jun. 26, 1998

[51] Int. Cl.$^7$ .............................. C08G 77/08; C08G 77/26
[52] U.S. Cl. ................................ 528/17; 524/847; 528/38
[58] Field of Search .................... 528/17, 38; 524/847

[56] References Cited

U.S. PATENT DOCUMENTS

| | | | |
|---|---|---|---|
| 3,065,194 | 11/1962 | Nitzsche et al. | 260/37 |
| 3,082,527 | 3/1963 | Nitzsche et al. | 32/17 |
| 3,127,363 | 3/1964 | Nitzsche et al. | 260/18 |
| 3,708,467 | 1/1973 | Smith et al. | 260/185 |
| 3,779,986 | 12/1973 | Smith et al. | 260/46.5 |
| 3,847,848 | 11/1974 | Beers et al. | 260/18 |
| 3,922,246 | 11/1975 | Ceyzeriat et al. | 260/37 |
| 3,965,280 | 6/1976 | Ceyzeriat et al. | 427/126 |
| 4,483,973 | 11/1984 | Lucas et al. | 528/21 |
| 4,530,882 | 7/1985 | Homan et al. | 428/452 |
| 4,722,967 | 2/1988 | Beers et al. | 524/860 |
| 4,797,446 | 1/1989 | Dietlein et al. | 524/860 |
| 5,266,631 | 11/1993 | Arai et al. | 524/847 |
| 5,679,726 | 10/1997 | Gutek et al. | 523/212 |
| 5,733,996 | 3/1998 | De Buyl et al. | 528/17 |
| 5,840,794 | 11/1998 | Palmer | 524/425 |

FOREIGN PATENT DOCUMENTS

| | | |
|---|---|---|
| EP 802 222 | 10/1997 | European Pat. Off. . |
| 1284203 | 8/1972 | United Kingdom . |
| 1394206 | 5/1975 | United Kingdom . |

*Primary Examiner*—Robert Dawson
*Assistant Examiner*—Jeffrey B. Robertson
*Attorney, Agent, or Firm*—Patricia M. Scaduto

[57] ABSTRACT

A silica filled room temperature vulcanizing (RTV) composition, curable in the presence of moisture and having good adhesion to glass and ceramic materials. The RTV composition comprises (A) about 20 to 95 weight percent polymers comprising on average at least 1.2 hydroxysilyl chain terminations per molecule or on average at least 1.2 alkoxysilyl chain terminations per molecule; (B) about 0.05 to 1.4 weight percent of a titanium compound; (C) a sufficient amount of an aminofunctional alkoxysilane to provide a nitrogen concentration from about 0.01 to 2 weight percent; (D) about 0.5 to 40 weight percent of an alkoxysilane; and (E) about 3 to 40 weight percent of a silica filler.

15 Claims, No Drawings

6,107,435

SILICA FILLED RTV COMPOSITIONS HAVING ADHESION TO GLASS AND CERAMIC MATERIALS

FIELD OF THE INVENTION

The invention is a silica filled room temperature vulcanizing (RTV) composition, curable in the presence of moisture and having good adhesion to glass and ceramic materials. The RTV composition comprises (A) about 20 to 95 weight percent polymers comprising on average at least 1.2 hydroxysilyl chain terminations per molecule or on average at least 1.2 alkoxysilyl chain terminations per molecule; (B) about 0.05 to 1.4 weight percent of a titanium compound; (C) a sufficient amount of an aminofunctional alkoxysilane to provide a nitrogen concentration from about 0.01 to 2 weight percent; (D) about 0.5 to 40 weight percent of an alkoxysilane; and (E) about 3 to 40 weight percent of a silica filler.

BACKGROUND OF THE INVENTION

Polyorganosiloxane compositions which cure to elastomeric materials at room temperature are well known. Such compositions can be obtained by mixing polydiorganosiloxanes having reactive groups, such as silanol groups, with silane crosslinking agents, for example, alkoxysilanes, acetoxysilanes, oximosilanes, or aminosilanes. Compositions comprising these ingredients can then be cured by exposure to atmospheric moisture at room temperature. Many of these compositions, however, evolve by-products during cure such as acetic acid and ketoximes which have unpleasant odors and may be corrosive. The use of other compositions which would not have these properties would therefore be beneficial.

One potential alternative is a "neutral cure" RTV composition which does not evolve these types of by-products. An example of a neutral cure RTV composition liberates alcohol during cure and comprises polydiorganosiloxanes having hydroxysilyl or alkoxysilyl chain terminations, an alkoxysilane and a titanium compound. When these compositions are made into sealants, different fillers are often added so that certain desired rheological properties may be obtained such as non-slump handling characteristics. Although desired rheological properties may be obtained, it has been observed that the addition of certain quantities of a silica filler to these compositions may affect the adhesive properties of the sealant to various substrates. Therefore, it would be beneficial to prepare a neutral cure composition having improved adhesive properties under these conditions.

The present inventors have unexpectedly determined that RTV compositions comprising polymers having hydroxysilyl or alkoxysilyl chain terminations, a titanium compound, an alkoxysilane, and a silica filler have improved adhesion to glass and ceramic materials when the titanium compound is present in only about 0.05 to 1.4 weight percent based on the total weight of the RTV composition and a sufficient amount of an aminofunctional alkoxysilane is added to provide a nitrogen concentration from about 0.01 to 2 weight percent based on the total weight of the RTV composition.

One objective of the present invention is to prepare a silica filled RTV composition having improved adhesion to glass and ceramic materials. Another objective of the present invention is to provide a method of adhering a silica filled RTV composition to glass or ceramic materials.

SUMMARY OF THE INVENTION

The present invention is a silica filled RTV composition, curable in the presence of moisture and having improved adhesion to glass and ceramic materials. The RTV composition comprises (A) about 20 to 95 weight percent polymers comprising on average at least 1.2 hydroxysilyl chain terminations per molecule or on average at least 1.2 alkoxysilyl chain terminations per molecule; (B) about 0.05 to 1.4 weight percent of a titanium compound; (C) a sufficient amount of an aminofunctional alkoxysilane to provide a nitrogen concentration from about 0.01 to 2 weight percent; (D) about 0.5 to 40 weight percent of an alkoxysilane; and (E) about 3 to 40 weight percent of a silica filler.

DETAILED DESCRIPTION OF THE INVENTION

This invention is a RTV composition, curable in the presence of moisture, comprising (A) about 20 to 95 weight percent polymers comprising on average at least 1.2 hydroxysilyl chain terminations per molecule described by formula $$—SiR^9_2OH, \qquad (I)$$

or on average at least 1.2 alkoxysilyl chain terminations per molecule described by formula $$—SiR^9_x(OR)_{3-x}, \qquad (II)$$

where each R is an independently selected alkyl radical comprising 1 to about 8 carbon atoms, each $R^9$ is independently selected from the group consisting of monovalent hydrocarbon radicals comprising 1 to about 18 carbon atoms and monovalent halohydrocarbon radicals comprising 1 to about 18 carbon atoms, and x is 0 or 1;

(B) about 0.05 to 1.4 weight percent of a titanium compound;

(C) a sufficient amount of an aminofunctional alkoxysilane described by formula $$X_2N—R^6—SiR^7_y(OR^8)_{3-y}$$

to provide a nitrogen concentration from about 0.01 to 2 weight percent, where $R^6$ is selected from the group consisting of divalent hydrocarbon radicals comprising about 2 to 18 carbon atoms and divalent halohydrocarbon radicals comprising about 2 to 18 carbon atoms, each $R^7$ is an independently selected monovalent hydrocarbon radical comprising 1 to about 18 carbon atoms, each $R^8$ is an independently selected alkyl radical comprising 1 to about 6 carbon atoms, each X is independently selected from the group consisting of hydrogen, monovalent hydrocarbon radicals comprising 1 to about 18 carbon atoms, and a group expressed by formula —$R^6$—$NX_2$, where $R^6$ and X are as defined above, and y is 0, 1, or 2;

(D) about 0.5 to 40 weight percent of an alkoxysilane described by formula $$R^7_zSi(OR^8)_{4-z};$$

where each $R^7$ is an independently selected monovalent hydrocarbon radical comprising 1 to about 18 carbon atoms, each $R^8$ is an independently selected alkyl radical comprising 1 to about 6 carbon atoms, and z is 0, 1, or 2, provided that when Component (A) comprises polymers comprising on average at least 1.2 hydroxysilyl chain terminations per molecule z is not 2; and (E) about 3 to 40 weight percent of a silica filler.

The present RTV composition comprises polymers (Component (A)) comprising on average at least 1.2 hydroxysilyl chain terminations per molecule or on average at least 1.2 alkoxysilyl chain terminations per molecule described by formulas (I) and (II) respectively. The polymers may be linear or branched and may be homopolymers, copolymers, or terpolymers. The viscosity of the polymers is not critical and the polymers may be a single species or a mixture of different polymers so long as the polymers comprise on average at least 1.2 hydroxysilyl chain terminations per molecule or on average at least 1.2 alkoxysilyl chain terminations per molecule.

The repeating units of the polymers of Component (A) may include organic units, such as oxyalkylene units, or preferably siloxy units such as described by $R^9_s SiO_{(4-s)/2}$, where each $R^9$ is independently selected from the group consisting of monovalent hydrocarbon radicals comprising about 1 to 18 carbon atoms and monovalent halohydrocarbon radicals comprising about 1 to 18 carbon atoms; and s is 0, 1, or 2. Examples of monovalent hydrocarbon radicals comprising about 1 to 18 carbon atoms include alkyl radicals such as methyl, ethyl, hexyl, and octadecyl; alkenyl radicals such as vinyl, allyl, and butadienyl; cycloalkyl radicals such as cyclobutyl, cyclopentyl, and cyclohexyl; cycloalkenyl radicals such as cyclopentenyl, and cyclohexenyl; aryl radicals such as phenyl and xenyl; aralkyl radicals as benzyl; and alkaryl radicals such as tolyl. Examples of monovalent halohydrocarbon radicals comprising 1 to about 18 carbon atoms include 3,3,3-trifluoropropyl and chloromethyl. The preferred polymers of Component (A) comprise polydiorganosiloxanes having repeating units described by —$(R^9_s SiO_{(4-s)/2})_f$—, where each $R^9$ is independently selected from the group consisting of monovalent hydrocarbon radicals comprising 1 to about 6 carbon atoms and fluorinated alkyl groups, and is more preferably methyl or ethyl, s is 2, and f is a value such that Component (A) has a viscosity within a range of about 0.5 to 3000 Pa•s at 25° C. and preferably within a range of about 5 to 150 Pa•s at 25° C.

The polymers of Component (A) comprise on average at least 1.2 hydroxysilyl chain terminations per molecule or on average at least 1.2 alkoxysilyl chain terminations per molecule described by the formulas (I) and (II) respectively. Preferably, the polymers of Component (A) comprise on average at least 1.5 hydroxysilyl chain terminations per molecule or on average at least 1.5 alkoxysilyl chain terminations per molecule, with on average at least 1.5 alkoxysilyl chain terminations per molecule being most preferred.

In formula (II) each R is an independently selected alkyl radical comprising 1 to about 8 carbon atoms. Examples of R include methyl, ethyl, n-propyl, isopropyl, n-butyl, sec-butyl, iso-butyl, t-butyl, hexyl and octyl. Preferably, each R is an independently selected alkyl radical comprising 1 to about 4 carbon atoms. More preferably each R is independently selected from the group consisting of methyl and ethyl.

In formulas (I) and (II) each $R^9$ is independently selected from the group consisting of monovalent hydrocarbon radicals comprising 1 to about 18 carbon atoms and monovalent halohydrocarbon radicals comprising 1 to about 18 carbon atoms. Examples of $R^9$ are as described above.

Subscript x in formula (II) is 0 or 1 and is preferably 0.

In more preferred embodiments of Component (A), a spacer group Z is bonded to the silicon atom of the alkoxysilyl chain termination, where Z is selected from the group consisting of divalent hydrocarbon radicals comprising about 2 to 18 carbon atoms, divalent halohydrocarbon radicals comprising about 2 to 18 carbon atoms, and a combination of divalent hydrocarbon radicals and siloxane segments described by formula

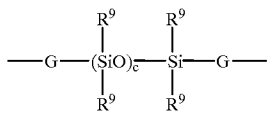

where $R^9$ is as defined above, each G is selected from the group consisting of divalent hydrocarbon radicals comprising about 2 to 18 carbon atoms and divalent halohydrocarbon radicals comprising about 2 to 18 carbon atoms, and c is a whole number from 1 to about 6.

Examples of the divalent hydrocarbon radicals comprising 2 to 18 carbon atoms of Z and G include alkylene radicals such as ethylene, methylmethylene, propylene, butylene, pentylene, hexylene, and octadecylene; alkylene radicals such as vinylene, allylene, and butadienylene; cycloalkylene radicals such as cyclobutylene, cyclopentylene, and cyclohexylene; cycloalkenylene radicals such as cyclopentenylene, and cyclohexenylene; arylene radicals such as phenylene and xenylene; aralkylene radicals as benzylene; and alkarylene radicals such as tolylene.

Examples of divalent halohydrocarbon radicals comprising 2 to about 18 carbon atoms of Z and G include 3,3,3-trifluoropropylene and chloromethylene.

When Z is a combination of divalent hydrocarbon radicals and siloxane segments as described above, each G is preferably an alkylene radical, and each G is more preferably an alkylene radical comprising about 2 to 6 carbon atoms. Preferably, Z is a divalent hydrocarbon radical comprising about 2 to 18 carbon atoms. It is more preferred for Z to be an alkylene radical, with an alkylene radical comprising about 2 to 6 carbon atoms being most preferred.

Since the polymers of Component (A) are required to have on average at least 1.2 hydroxysilyl chain terminations per molecule or on average at least 1.2 alkoxysilyl chain terminations per molecule, some polymers may contain other types of chain terminations. Preferably, this other type of chain termination comprises an organosilyl chain termination described by $R^9_3$—Si—, where each $R^9$ is independently selected from the group consisting of monovalent hydrocarbon radicals comprising about 1 to 18 carbon atoms and monovalent halohydrocarbon radicals comprising about 1 to 18 carbon atoms. Examples of $R^9$ are as described above. Examples of organosilyl chain terminations include trimethylsilyl, triethylsilyl, vinyldimethylsilyl, and vinylmethylphenylsilyl.

The hydroxysilyl chain terminated and alkoxysilyl chain terminated polydiorganosiloxanes useful in the present method are well known in the art and are illustrated by Ceyzeriat et al., U.S. Pat. No. 3,151,099; Brown et al., U.S. Pat. No. 3,161,614; Weyenberg, U.S. Pat. No. 3,175,993 and U.S. Pat. No. 3,334,067; Klosowski et al., U.S. Pat. No. 4,871,827; Kamis et al., U.S. Pat. No. 4,898,910; and Chu et al., U.S. Pat. No. 4,956,435; all of which are hereby incorporated by reference to show RTV sealant ingredients and methods of preparing RTV sealant compositions.

Hydoxysilyl chain terminated polydiorganosiloxanes within the scope of Component (A), are described, for example, by formula (IIIA),

(IIIA)

and by mixtures of the hydroxysilyl chain terminated polydiorganosiloxane described by formula (IIIA) and a hydroxysilyl chain terminated polydiorganosiloxane described by formula (IIIB)

(IIIB)

where $R^9$ and f are as defined above.

Alkoxysilyl chain terminated polydiorganosiloxanes within the scope of Component (A), are described, for example, by formula (IV)

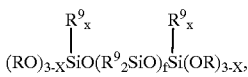

(IV)

and by mixtures of the alkoxysilyl chain terminated polydiorganosiloxanes described by formula (IV) and alkoxysilyl chain terminated polydiorganosiloxanes described, for example, by formula (V)

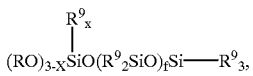

(V)

where R, $R^9$, x, and f are as defined above.

Preferred alkoxysilyl chain terminated polydiorganosiloxanes within the scope of Component (A), include those described for example, by formula (VI)

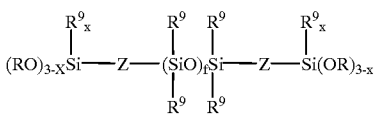

(VI)

where R, $R^9$, Z, x, and f are as described above.

Other preferred Component (A) polymers useful in this invention are mixtures of the alkoxysilyl chain terminated polydiorganosiloxanes described by formula (VI) and the alkoxysilyl chain terminated polydiorganosiloxanes described, for example, by formula (VII)

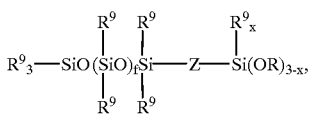

(VII)

where R, $R^9$, Z, x and f are as defined above.

When Component (A) comprises mixtures of hydroxysilyl chain terminated polydiorganosiloxanes described by formulas (IIIA) and (IIIB), typically the polydiorganosiloxane described by formula (IIIB) will be present in an amount such that 40 percent or less of the chain terminations of Component (A) will be organosilyl chain terminations, and preferably such that less than 25 percent of the chain terminations of Component (A) are organosilyl chain terminations.

When Component (A) comprises mixtures of alkoxysilyl chain terminated polydiorganosiloxanes described by formulas (VI) and (VII), typically the polydiorganosiloxane described by formula (VII) will be present in an amount such that 40 percent or less of the chain terminations of Component (A) will be organosilyl chain terminations, and preferably such that less than 25 percent of the chain terminations of Component (A) are organosilyl chain terminations.

Component (A) can also include organic polymers comprising on average at least 1.2 hydroxysilyl chain terminations per molecule or on average at least 1.2 alkoxysilyl chain terminations per molecule described by formulas (I) and (II) respectively i.e., $-SiR^9{}_2OH$ and $-SiR^9{}_x(OR)_{3-x}$, where R, $R^9$, and x are as defined above. The organic polymers within the scope of Component (A) may also comprise a spacer group $-Z-$ bonded to the silicon atom of the alkoxysilyl chain termination, where Z is as defined above. One type of organic polymer useful in the invention is the polyoxyalkylene, described by Okawa et al., U.S. Pat. No. 5,403,881, and hereby incorporated by reference to show polyoxyalkylene polymers comprising on average at least 1.2 alkoxysilyl chain terminations per molecule described by formula (II) and methods of preparing these polymers.

The amount of Component (A) useful in the RTV compositions of the present method is from about 20 to 95 weight percent based on the total weight of the RTV composition. Preferably, (A) is added in amounts from about 50 to 80 weight percent on the same basis, with amounts from about 60 to 75 weight percent on the same basis being most preferred.

The RTV compositions of the present invention also comprise a titanium compound (B). The titanium compound can be any of those known to be useful for facilitating crosslinking in silicone sealant compositions, including tetraalkyltitanates such as tetraisopropyltitanate, tetra-n-butyltitanate, tetraoctyltitanate, tetra-tertiary-butyltitanate, tetra-tertiary-amyltitanate, and other tetraalkyltitanates such as described in U.S. Pat. No. 5,733,996, chelated titanates such as dialkoxyacetylacetonate titanate chelate and dialkoxyethylacetoacetate titanate chelate, where the alkoxy group includes isopropoxy or isobutoxy, and other chelated titanates such as described in U.S. Pat. Nos. 3,708,467 and 3,779,986; organosiloxytitanium compounds such as described in U.S. Pat. No. 3,334,067, and beta-dicarbonyl titanium compounds such as described in U.S. Pat. No. 3,334,067, each of these patents being herein incorporated by reference to show titanium compounds and methods of manufacture; and other titanium compounds such as $(CH_2CH_2CH_2O)_3TiOTi(OCH_2CH_2CH_3)_3$. Preferred titanium compounds are the tetraalkyltitanates and the chelated titanates. More preferred are the tetra-tertiary-alkyltitanates with tetra-tertiary-butyltitanate being most preferred.

The amount of (B) useful in the RTV silicone compositions of the present invention is from about 0.05 to 1.4 weight percent based on the total weight of the RTV composition. Preferably, (B) is added in amounts from about 0.2 to 1.3 weight percent on the same basis, with from about 0.5 to 1.2 weight percent on the same basis being most preferred. The titanium compound may be added as a single species or as a mixture of two or more species.

The RTV composition of the present invention also comprises a sufficient amount of an aminofunctional alkoxysilane described by formula

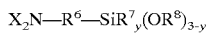
$$X_2N-R^6-SiR^7_y(OR^8)_{3-y}$$

to provide a nitrogen concentration from about 0.01 to 2 weight percent based on the total weight of the RTV composition, where $R^6$ is selected from the group consisting of divalent hydrocarbon radicals comprising about 2 to 18 carbon atoms and divalent halohydrocarbon radicals comprising about 2 to 18 carbon atoms, each $R^7$ is an independently selected monovalent hydrocarbon radical comprising 1 to about 18 carbon atoms, each $R^8$ is an independently selected alkyl radical comprising 1 to about 6 carbon atoms, each X is independently selected from the group consisting of hydrogen, monovalent hydrocarbon radicals comprising 1 to about 18 carbon atoms, and a group expressed by formula $-R^6-NX_2$, where $R^6$ and X are defined above, and y is 0, 1, or 2.

The aminofunctional alkoxysilane useful herein includes not only the compositions described by the above formula but also partial hydrolyzates thereof and reaction products of aminofunctional alkoxysilanes described by the above formula and other materials, so long as a nitrogen concentration from about 0.01 to 2 weight percent based on the total weight of the RTV composition is provided.

Examples of the divalent hydrocarbon radicals and divalent halohydrocarbon radicals each comprising about 2 to 18 carbon atoms represented by $R^6$ are provided above in the description of Z. Preferably, $R^6$ is an alkylene radical. More preferably $R^6$ is an alkylene radical comprising about 2 to 6 carbon atoms.

Examples of the monovalent hydrocarbon radicals represented by $R^7$ are as described above for $R^9$. Preferably, each $R^7$ is independently selected from the group consisting of monovalent hydrocarbon radicals comprising 1 to about 6 carbon atoms. More preferably each $R^7$ is methyl or ethyl.

Examples of the alkyl radicals represented by $R^8$ include methyl, ethyl, propyl, butyl and hexyl. Preferably, each $R^8$ is selected from the group consisting of alkyl radicals comprising 1 to about 4 carbon atoms. More preferably $R^8$ is methyl or ethyl.

Examples of the monovalent hydrocarbon radicals comprising 1 to about 18 carbon atoms represented by X are as described above for $R^9$. Examples of $R^6$ in the group expressed by formula $-R^6-NX_2$ are as defined above.

Preferably, each X is independently selected from the group consisting of hydrogen, monovalent hydrocarbon radicals comprising 1 to about 6 carbon atoms, and the group expressed by formula $-R^6-NX_2$, where $R^6$ and X are as defined above. More preferably, each X is independently selected from the group consisting of hydrogen, alkyl radicals comprising 1 to about 6 carbon atoms, and the group expressed by formula $-R^6-NX_2$, where $R^6$ and X are as defined above.

Subscript y may be 0, 1, or 2. Preferably y is 0 or 1.

Examples of aminofunctional alkoxysilane compounds useful in the present invention include $(CH_3O)_3Si-(CH_2)_3-NH_2$, $(C_2H_5O)_3Si-(CH_2)_3-NH_2$, $(CH_3O)_3Si-(CH_2)_3-NH-(CH_2)_2-NH_2$, $(CH_3O)_3Si-(CH_2)_3-NH-(CH_2)_6-NH_2$, $(C_2H_5O)_3Si-(CH_2)_3-NH-(CH_2)_2-NH_2$, $(CH_3O)_2(CH_3)Si-(CH_2)_3-NH-(CH_2)_2-NH_2$, $(CH_3O)_3Si-(CH_2)_4-NH-(CH_2)_2-NH-(CH_2)_2-NH-(CH_2)_2-NH_2$, and $(CH_3O)_3Si-(CH_2)_3-NH-(CH_2)_2-N(CH_3)_2$.

The amount of aminofunctional alkoxysilane useful in the RTV silicone composition of the present invention is that amount sufficient to provide a nitrogen concentration from about 0.01 to 2 weight percent based on the total weight of the RTV composition, with an amount sufficient to provide a nitrogen concentration from about 0.1 to 1 weight percent on the same basis being preferred and an amount sufficient to provide a nitrogen concentration from about 0.2 to 0.5 weight percent on the same basis being most preferred.

The RTV compositions of the present invention also comprise an alkoxysilane (D) described by formula $R^7_zSi(OR^8)_{4-z}$, where each $R^7$ is an independently selected monovalent hydrocarbon radical comprising from 1 to about 18 carbon atoms; each $R^8$ is an independently selected alkyl radical comprising 1 to about 6 carbon atoms, and z is 0, 1, or 2, provided that when Component (A) comprises polymers comprising on average at least 1.2 hydroxysilyl chain terminations per molecule z is not 2.

Examples of the monovalent hydrocarbon radicals represented by $R^7$ are as described above for $R^9$. Preferably, each $R^7$ is independently selected from the group consisting of monovalent hydrocarbon radicals comprising 1 to about 6 carbon atoms. More preferably each $R^7$ is methyl or ethyl.

Examples of the alkyl radicals represented by $R^8$ include methyl, ethyl, propyl, and butyl. Preferably, each $R^8$ is selected from the group consisting of alkyl radicals comprising 1 to about 4 carbon atoms. More preferably $R^8$ is methyl or ethyl.

Subscript z can be 0, 1, or 2, provided that when Component (A) comprises polymers comprising on average at least 1.2 hydroxysilyl chain terminations per molecule z is not 2. Preferably z is 1 or 2 with 1 being most preferred.

Examples of useful alkoxysilanes include methyltrimethoxysilane, methyltriethoxysilane, vinyltrimethoxysilane, phenyltrimethoxysilane, dodecyltrimethoxysilane, vinyltriethoxysilane, ethyltrimethoxysilane, ethyltriethoxysilane, dimethyldimethoxysilane, vinylmethyldimethoxysilane, dimethyldiethoxysilane, ethylmethyldiethoxysilane and tetraethoxysilane.

The amount of alkoxysilane useful in the RTV compositions of the present invention is from about 0.5 to 40 weight percent based on the total weight of the RTV composition, with about 1 to 10 weight percent on the same basis being preferred. The alkoxysilane may be a single species or a mixture of two or more species.

The RTV compositions of the present invention also comprise a silica filler (E). The silica filler may be a fumed silica, precipitated silica, or silica gel and may have a treated or untreated surface. Typically, the silica filler will have a surface area from about 50 to 900 $m^2/g$. Preferably, the surface area of the silica filler will be from about 150 to 300 $m^2/g$. Preferred silica fillers are fumed and have untreated surfaces.

The type and amount of silica filler added depends upon the physical properties desired for the cured RTV composition. The amount of silica filler useful in the RTV composition of the present invention is from about 3 to 40 weight percent based on the total weight of the RTV composition. Preferably, the silica filler is added in amounts from about 6 to 15 weight percent on the same basis. The silica filler may be a single species or a mixture of two or more species.

Other fillers may also be added as desired such as ground, precipitated, and colloidal calcium carbonates which are untreated or treated with stearate or stearic acid; crushed quartz, ground quartz, alumina, aluminum hydroxide, titanium dioxide, diatomaceous earth, iron oxide, carbon black, and graphite.

Other ingredients which are conventionally used in RTV compositions such as rheology additives, fungicides, colorants, pigments, and plasticizers can be added as long as they do not interfere with the desired properties.

The RTV composition of this invention may be prepared by mixing all the ingredients together in amounts as specified to provide a composition which is stable in the absence of moisture and which cures when exposed to moisture. These compositions are preferably prepared by mixing all the ingredients under anhydrous conditions. This means that the amounts of moisture or water in the ingredients used should be minimized and the conditions of mixing should minimize the amounts of moisture or water allowed into the system. Excess moisture or water may have deleterious effects on the composition, such as causing curing in the storage package or reduced cured properties.

The present compositions may be prepared as either a one package system or a two (or multi) package system. With a one package system, all the ingredients are mixed together and stored in an anhydrous state. With a two or multi package system the ingredients may be stored separately and then mixed prior to use. For convenience, a one part sealant is preferred.

The present RTV compositions having improved adhesion may be used, for example, for sealing openings, such as joints, gaps or seams, in a glass or ceramic substrate or between such substrates, or for forming a seal between at least two substrates.

A method of sealing openings between substrates using the present composition comprises for example, (i) providing at least two substrates selected from the group consisting of glass and ceramic, the substrates having an opening therebetween; (ii) applying a RTV composition which is curable in the presence of moisture, so to cover the opening, the RTV composition comprising Components (A)–(E), as described above; and (iii) exposing the RTV composition to moisture to effect curing.

A method for forming a seal using the present composition comprises for example, (i) providing at least two substrates selected from the group consisting of glass and ceramic, the substrates having a plurality of surfaces; (ii) applying a layer of a RTV composition which is curable in the presence of moisture, to at least a portion of at least one of the surfaces of at least one of the substrates, the RTV composition comprising Components (A)–(E), as described above; (iii) bringing at least two of the substrates, where at least one of the substrates has the RTV composition applied thereto, into proximity so as to form a seal of the RTV composition therebetween; and (iv) exposing the seal of step (iii) to moisture to effect curing of the RTV composition.

The substrates useful for this method are selected from the group consisting of glass and ceramic and preferably are glass.

This invention is further illustrated by the following examples which are presented for that purpose and are not intended to limit the scope of the claims herein. In the examples, viscosities were measured at 25° C.

EXAMPLES

ADHESION TESTING

A modified version of the ASTM C 794-80 adhesion in peel test was employed. Test specimens were prepared by tooling sealant having a thickness of 3.2 mm onto the surface of isopropyl alcohol cleaned glass. Immediately after the sealant was applied a 60 mess stainless steel cloth was pressed onto the sealant. A second layer of sealant was then applied to the top surface of the cloth so the total thickness of the sample was 6.4 mm (0.25 in.). The peel width was 12.7 mm (0.5 in.) controlled by cutting the peel samples after cure using a razor and a straight edge. The samples were allowed to cure for 21 days at 23° C.±2° C., 50%±5% relative and then aged for 500 hours in a QUV weatherometer in accordance with ASTM G53-84 Standard Practice for Operating Light- and Water-Exposure Apparatus (fluorescent UV-condensation type) for Exposure of Nonmetallic Materials, with the exception that 340 nanometer (nm) radiation was used instead of 313 nm radiation. Adhesion was tested by manually pulling on the stainless steel cloth, thereby removing the sealant from the glass in a peeling motion. If the glass surface exposed by the removal of the sealant appears to have no sealant residue adhered to its surface by visual inspection, then the adhesion is considered to be poor and the failure mode is said to be adhesive. The sealant is categorized as failing cohesively if the glass surface which was exposed by removing the sealant appears to have visible sealant residue adhered to the glass surface. Sealant which fails cohesively in the peeling test is considered to pass the test, while sealant which fails adhesively in the peeling test is considered to fail the test.

INGREDIENTS

POLYMER: an ethyltriethoxy endblocked polydimethylsiloxane having a viscosity of approximately 20 Pa•s.

SILICA FILLER: an untreated fumed silica filler having an average surface area of about 150 m$^2$/g.

PLASTICIZER: a trimethyl endblocked polydimethylsiloxane having a viscosity of approximately 0.1 Pa•s.

RHEOLOGY ADDITIVE: a polyoxypropylene-block-polydimethylsiloxane polymer having a viscosity of approximately 0.2 Pa•s.

TITANATE: Tyzor® 9000 titanate, a tetra-tertiary butyltitanate produced by Dupont Chemical Company (Deepwater, N.J.).

ADHESION PROMOTER: reaction product of approximately 78 wt % silanol endblocked polydimethylsiloxane having a viscosity of about 50 MPa•s with approximately 8 wt % methyltrimethoxysilane and approximately 14 wt % 3-aminopropyltrimethoxysilane.

Example 1

Samples were prepared by sequential addition of each ingredient as listed in Table 1 into a mixer. After mixing for 30 minutes with a nitrogen purge, the resulting composition was mixed for 5 additional minutes under 25 inches mercury vacuum. The compositions were extruded into cartridges and then tested as described above. See Table 1 for ingredients and results.

TABLE 1

Effect of Titanate Amount

| INGREDIENTS (parts by weight) | 1-1 | 1-2 | 1-3* |
|---|---|---|---|
| POLYMER | 70 | 70 | 70 |
| PLASTICIZER | 13 | 13 | 13 |
| METHYLTRIMETHOXYSILANE | 4 | 4 | 4 |
| TITANATE | .5 | 1.3 | 2 |
| SILICA | 9.5 | 9.5 | 9.5 |
| RHEOLOGY ADDITIVE | 1 | 1 | 1 |
| GLYCIDOXYPROPYLTRIMETHOXYSILANE | 0.21 | 0.20 | 0.20 |
| ADHESION PROMOTER | 1 | 1 | 1 |
| ADHESION TESTING | PASS | PASS | FAIL |

*Comparative Example

Example 2

Samples were prepared by sequential addition of each ingredient listed in Table 2 as described in Example 1. See Table 2 for ingredients and results. Example 2–4 demonstrates the need for an adhesion promoter in addition to the lower titanate level in order to obtain improved adhesion.

TABLE 2

Effect of Titanate Amount

| INGREDIENTS (parts by weight) | 2-1 | 2-2* | 2-3* | 2-4* |
|---|---|---|---|---|
| POLYMER | 70 | 70 | 70 | 70 |
| PLASTICIZER | 13 | 13 | 13 | 13 |
| METHYLTRIMETHOXYSILANE | 4 | 4 | 4 | 4 |
| TITANATE | 1.2 | 2.4 | 4.8 | 1.2 |
| SILICA | 9.5 | 9.5 | 9.5 | 9.5 |
| RHEOLOGY ADDITIVE | 1 | 1 | 1 | 0 |
| GLYCIDOXYPROPYL-TRIMETHOXYSILANE | 0.21 | 0.20 | 0.20 | 0 |
| ADHESION PROMOTER | 1 | 1 | 1 | 0 |
| ADHESION TESTING | Pass | Fail | Fail | Fail |

*Comparative Example

We claim:

1. A RTV composition, curable in the presence of moisture, comprising (A) about 20 to 95 weight percent polymers comprising on average at least 1.2 hydroxysilyl chain terminations per molecule described by formula $$—SiR^9_2OH, \quad (I)$$

or on average at least 1.2 alkoxysilyl chain terminations per molecule described by formula $$—SiR^9_x(OR)_{3-x}, \quad (II)$$

where each R is an independently selected alkyl radical comprising 1 to about 8 carbon atoms, each $R^9$ is independently selected from the group consisting of monovalent hydrocarbon radicals comprising 1 to about 18 carbon atoms and monovalent halohydrocarbon radicals comprising 1 to about 18 carbon atoms, and x is 0 or 1;

(B) about 0.05 to 1.4 weight percent of a titanium compound;

(C) a sufficient amount of an aminofunctional alkoxysilane described by formula $$X_2N—R^6—SiR^7_y(OR^8)_{3-y}$$

to provide a nitrogen concentration from about 0.01 to 2 weight percent, where $R^6$ is selected from the group consisting of divalent hydrocarbon radicals comprising about 2 to 18 carbon atoms and divalent halohydrocarbon radicals comprising about 2 to 18 carbon atoms, each $R^7$ is an independently selected monovalent hydrocarbon radical comprising 1 to about 18 carbon atoms, each $R^8$ is an independently selected alkyl radical comprising 1 to about 6 carbon atoms, each X is independently selected from the group consisting of hydrogen, monovalent hydrocarbon radicals comprising 1 to about 18 carbon atoms, and a group expressed by formula $—R^6—NX_2$, where $R^6$ and X are as defined above, and y is 0, 1, or 2;

(D) about 0.5 to 40 weight percent of an alkoxysilane described by formula $$R^7_zSi(OR^8)_{4-z};$$

where each $R^7$ is an independently selected monovalent hydrocarbon radical comprising 1 to about 18 carbon atoms, each $R^8$ is an independently selected alkyl radical comprising 1 to about 6 carbon atoms, and z is 0, 1, or 2, provided that when Component (A) comprises polymers comprising on average at least 1.2 hydroxysilyl chain terminations per molecule z is not 2; and (E) about 3 to 40 weight percent of a silica filler.

2. The RTV composition according to claim 1, where Component (A) comprises a hydroxysilyl chain terminated polydiorganosiloxane described by formula (IIIA), $$HO—\underset{\underset{R^9_2}{|}}{Si}O(R^9_2SiO)_f\underset{\underset{R^9_2}{|}}{Si}—OH, \quad (IIIA)$$

or a mixture of the polydiorganosiloxane described by formula (IIIA) and a hydroxysilyl chain terminated polydiorganosiloxane described by formula (IIIB)

$$HO—\underset{\underset{R^9_2}{|}}{Si}O(R^9_2SiO)_fSi—R^9_3, \quad (IIIB)$$

or an alkoxysilyl chain terminated polydiorganosiloxane described by formula (IV)

$$(RO)_{3-x}\underset{\underset{R^9_x}{|}}{Si}O(R^9_2SiO)_f\underset{\underset{R^9_x}{|}}{Si}(OR)_{3-x}, \quad (IV)$$

or a mixture of the polydiorganosiloxane described by formula (IV) and an alkoxysilyl chain terminated polydiorganosiloxane described by formula (V)

$$(RO)_{3-x}\underset{\underset{R^9_x}{|}}{Si}O(R^9_2SiO)_fSi—R^9_3, \quad (V)$$

where each R is an independently selected alkyl radical comprising 1 to about 4 carbon atoms; each $R^9$ is independently selected from the group consisting of monovalent hydrocarbon radicals comprising about 1 to 18 carbon atoms and monovalent halohydrocarbon radicals comprising about 1 to 18 carbon atoms; and f is a value such that Component (A) has a viscosity within a range of about 0.5 to 3000 Pa•s at 25° C.

3. The RTV composition according to claim 1, where Component (A) comprises a hydroxysilyl chain terminated polydiorganosiloxane described by formula (IIIA), $$HO—\underset{\underset{R^9_2}{|}}{Si}O(R^9_2SiO)_f\underset{\underset{R^9_2}{|}}{Si}—OH, \quad (IIIA)$$

or a mixture of the polydiorganosiloxane described by formula (IIIA) and a hydroxysilyl chain terminated polydiorganosiloxane described by formula (IIIB)

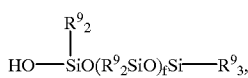

(IIIB)

or an alkoxysilyl chain terminated polydiorganosiloxane described by formula (IV)

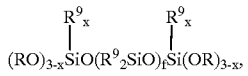

(IV)

or a mixture of the polydiorganosiloxane described by formula (IV) and an alkoxysilyl chain terminated polydiorganosiloxane described by formula (V)

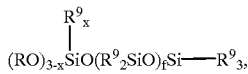

(V)

where each R is independently selected from the group consisting of methyl and ethyl; each $R^9$ is independently selected from the group consisting of monovalent hydrocarbon groups comprising 1 to about 6 carbon atoms and fluorinated alkyl groups; and f is a value such that Component (A) has a viscosity within a range of about 5 to 150 Pa•s at 25° C.

4. The RTV composition according to claim 1, where Component (A) comprises an alkoxysilyl chain terminated polydiorganosiloxane described by formula (VI)

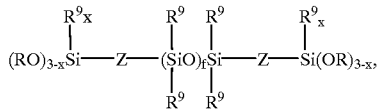

(VI)

or a mixture of the polydiorganosiloxane described by formula (VI) and an alkoxysilyl chain terminated polydiorganosiloxane described by formula (VII)

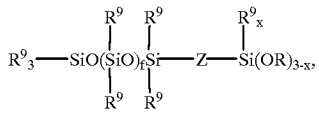

(VII)

where each $R^9$ is independently selected from the group consisting of monovalent hydrocarbon radicals comprising about 1 to 18 carbon atoms and monovalent halohydrocarbon radicals comprising about 1 to 18 carbon atoms; f is a value such that Component (A) has a viscosity within a range of about 0.5 to 3000 Pa•s at 25° C.; and each Z is selected from the group consisting of divalent hydrocarbon radicals comprising about 2 to 18 carbon atoms, divalent halohydrocarbon radicals comprising about 2 to 18 carbon atoms and a combination of divalent hydrocarbon radicals and siloxane segments described by formula

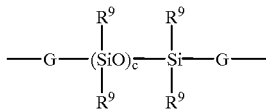

where $R^9$ is as defined above, each G is selected from the group consisting of divalent hydrocarbon radicals comprising about 2 to 18 carbon atoms and divalent halohydrocarbon radicals comprising about 2 to 18 carbon atoms, and c is a whole number from 1 to about 6.

5. The RTV composition according to claim 1, comprising from about 50 to 80 weight percent based on the total weight of the RTV composition of Component (A), where Component (A) comprises an alkoxysilyl chain terminated polydiorganosiloxane described by formula (VI)

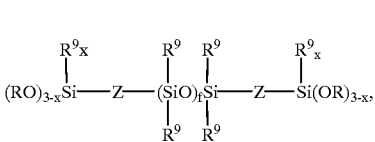

(VI)

or a mixture of the polydiorganosiloxane described by formula (VI) and an alkoxysilyl chain terminated polydiorganosiloxane described by formula (VII)

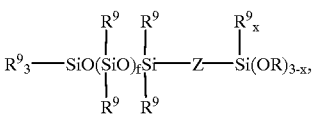

(VII)

where each R is an independently selected alkyl radical comprising 1 to about 4 carbon atoms; each $R^9$ is independently selected from the group consisting of monovalent hydrocarbon groups comprising 1 to about 6 carbon atoms and fluorinated alkyl groups; f is a value such that Component (A) has a viscosity within a range of about 0.5 to 3000 Pa•s at 25° C.; x is 0, each Z is independently selected from the group consisting of alkylenes and

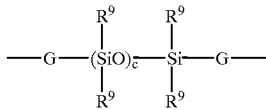

where each G is an alkylene and 40 percent or less of the chain terminations are organosilyl chain terminations.

6. The RTV composition according to claim 1, comprising from about 60 to 75 weight percent based on the total weight of the RTV composition of Component (A), where Component (A) comprises an alkoxysilyl chain terminated polydiorganosiloxane described by formula (VI)

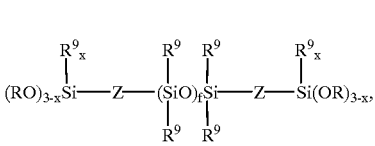

(VI)

or a mixture of the polydiorganosiloxane described by formula (VI) and an alkoxysilyl chain terminated polydiorganosiloxane described by formula (VII)

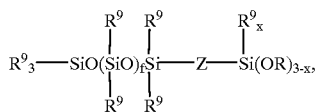
(VII)

where each R and $R^9$ is independently selected from the group consisting of methyl and ethyl; f is a value such that Component (A) has a viscosity within a range of about 5 to 150 Pa•s at 25° C.; x is 0, each Z is independently selected from the group consisting of alkylene radicals comprising about 2 to 6 carbon atoms and

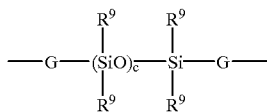

where each G is an independently selected alkylene radical comprising about 2 to 6 carbon atoms, and 25 percent or less of the chain terminations are organosilyl chain terminations.

7. The RTV composition according to claim 1, where the titanium compound is selected from the group consisting of a tetraalkyl titanate and a chelated titanate.

8. The RTV composition according to claim 3, comprising from about 0.5 to 1.3 weight percent based on the total weight of the RTV composition of a titanium compound which is selected from the group consisting of a tetraalkyl titanate and a chelated titanate.

9. The RTV composition according to claim 4, comprising from about 0.5 to 1.2 weight percent based on the total weight of the RTV composition of a tetra-tertiary-alkyltitanate.

10. The RTV composition according to claim 1, comprising a sufficient amount of the aminofunctional alkoxysilane to provide a nitrogen concentration from about 0.1 to 1 weight percent based on the total weight of the RTV composition where $R^6$ is an alkylene radical; each $R^7$ is independently selected from the group consisting of monovalent hydrocarbon radicals comprising 1 to about 6 carbon atoms; and each $R^8$ is independently selected from the group consisting of alkyl radicals comprising 1 to about 4 carbon atoms.

11. The RTV composition according to claim 5, comprising a sufficient amount of an aminofunctional silicon compound to provide a nitrogen concentration from about 0.2 to 0.5 weight percent based on the total weight of the RTV composition where $R^6$ is an alkylene radical; each $R^7$ is independently selected from the group consisting of monovalent hydrocarbon radicals comprising 1 to about 6 carbon atoms; each $R^8$ is independently selected from the group consisting of alkyl radicals comprising 1 to about 4 carbon atoms; and each X is independently selected from the group consisting of hydrogen, monovalent hydrocarbon radicals comprising 1 to about 6 carbon atoms, and the group expressed by formula —$R^6$—$NX_2$, where $R^6$ and X are as previously defined.

12. The RTV composition according to claim 7, comprising a sufficient amount of an aminofunctional silicon compound to provide a nitrogen concentration from about 0.2 to 0.5 weight percent based on the total weight of the RTV composition where $R^6$ is an alkylene radical comprising about 2 to 6 carbon atoms; each $R^7$ and $R^8$ is independently selected from the group consisting of methyl and ethyl; and each X is independently selected from the group consisting of hydrogen, alkyl radicals comprising 1 to about 6 carbon atoms, and the group expressed by formula —$R^6$—$NX_2$, where $R^6$ and X are as previously defined.

13. The RTV composition according to claim 9, comprising a sufficient amount of an aminofunctional silicon compound to provide a nitrogen concentration from about 0.2 to 0.5 weight percent based on the total weight of the RTV composition where $R^6$ is an alkylene radical comprising about 2 to 6 carbon atoms; each $R^7$ and $R^8$ is independently selected from the group consisting of methyl and ethyl; and each X is independently selected from the group consisting of hydrogen, monovalent hydrocarbon radicals comprising 1 to about 6 carbon atoms, and the group expressed by formula —$R^6$—$NX_2$, where $R^6$ and each X is as defined above.

14. The RTV composition according to claim 1, comprising from about 6 to 15 weight percent based on the total weight of the RTV composition of a fumed silica.

15. The RTV composition according to claim 14, comprising from about 6 to 15 weight percent based on the total weight of the RTV composition of a fumed silica having a surface area from about 150 to 300 $m^2/g$.

* * * * *